H. A. YATES.

SAFETY FUSE.

APPLICATION FILED APR. 5, 1916.

Reissued Aug. 15, 1916.

14,183.

Witnesses:

Fred C. Dorsey

T. J. Sauer.

Inventor

Harry A. Yates

By Henry M. Shepley

Atty.

UNITED STATES PATENT OFFICE.

HARRY A. YATES, OF NEW YORK, N. Y., ASSIGNOR TO ECONOMY FUSE & MANUFACTURING COMPANY, OF CHICAGO, ILLINOIS, A CORPORATION OF NEW YORK.

SAFETY-FUSE.

14,183. Specification of Reissued Letters Patent. Reissued Aug. 15, 1916.

Original No. 1,028,173, dated June 4, 1912, Serial No. 637,881. Application for reissue filed April 5, 1916. Serial No. 89,200.

*To all whom it may concern:*

Be it known that I, HARRY A. YATES, a citizen of the United States, residing at New York, in the county of New York and State of New York, have invented new and useful Improvements in Safety-Fuses, of which the following is a specification.

The present invention relates to certain novel and useful improvements in thermal cut-outs for electric circuits, and has particular application to a type of safety fuse, wherein the fusible conductor is melted under a heavy overload, or when a short circuit occurs, thereby forming an open circuit.

In carrying out my invention, it is my purpose to provide a safety fuse for electric circuits which will embrace the desired features of simplicity, efficiency, and economy in cost of manufacture and installation.

Furthermore, I aim to provide a safety fuse wherein, when operated through an overload or short circuit, the fusible element will be ruptured, and broken up into sections, which will fall or drop back into the shell or cylinder of the fuse body, thereby breaking the circuit and at the same time preventing the formation of an arc.

Still another object of the invention is to provide a form of safety fuse, in which the parts are so constructed and arranged that when the fusible conductor has been melted and broken up into sections, the circuit can not be reëstablished by a person inserting a piece of conducting wire in the shell or cylinder, and connecting the terminals at the caps. It is frequently the practice for an operator to reëstablish the circuit, after the safety fuse has been ruptured, in the manner above mentioned, with the result that the electrical equipment is oftentimes seriously damaged by short circuits and extremely heavy overloads. With the use of my invention, however, the possibility of the workman so reëstablishing the circuit is obviated, and consequent injury to the equipment prevented.

With the above-recited objects and others of a similar nature in view, the invention consists in the construction, combination and arrangement of parts, set forth in and falling within the scope of the appended claims.

Figure 1:
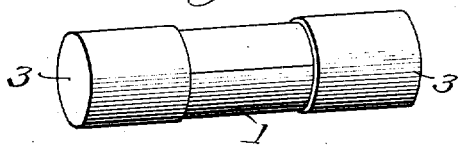
Figure 2:
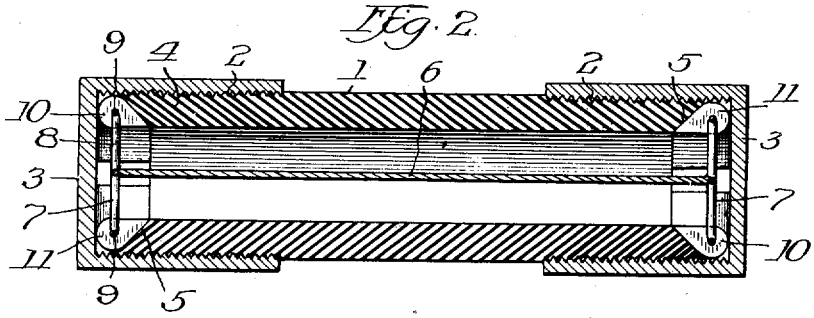
Figure 3:
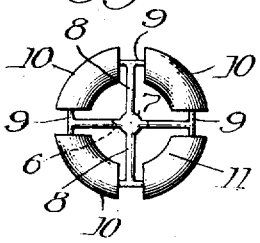
Figure 4:
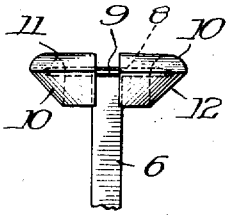
Figure 5:
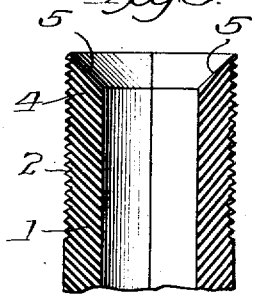
Figure 6:
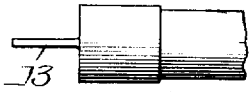
Figure 7:
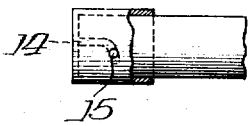

In the accompanying drawing:—Figure 1 is a perspective view of my improved safety fuse, the terminals of the caps being omitted; Fig. 2 is a vertical longitudinal sectional view of the same; Fig. 3 is an end elevation of one of the fusible ring heads; Fig. 4 is a side elevation of the ring head, showing a portion of the fusible strip connecting the two head members; Fig. 5 is a detail sectional view taken longitudinally through a portion of the cylinder or shell; Fig. 6 is a detail view in elevation of the end of one form of fuse casing and showing a terminal carried by the cap; and Fig. 7 is a detail view, partly in section, of a modified manner of attaching the cap to the cylinder or shell.

Referring now to the accompanying drawing in detail, the numeral 1 designates the cylinder or shell of the device, which, in the present instance is formed of two assembled semi-cylindrical sections, which are composed of a suitable non-conducting material. The ends of this shell, as shown in Figs. 2 and 5, are exteriorly threaded as at 2 for the reception of the interiorly threaded terminal caps 3 which are designed to be inserted in terminal clips in the usual manner. The end portions 4 of the shell are beveled inwardly as at 5 for the purpose hereinafter described.

The fusible conducting element of my invention, in the present instance comprises a strip 6 of fuse wire or ribbon having formed integral therewith at each end a spider 7 made up of the radiating arms 8, and the short cross arms 9 at the ends thereof, these cross arms connecting the fusible segments 10, so that when the latter are assembled as is shown in Fig. 3, they form a complete conducting head or ring. The cross arms 9 are of slightly less cross-sectional area than the radiating arms 8, for the reasons which will be explained hereinafter. As will be seen by reference to Figs. 2 and 4, each of the ring segments is formed of a curved crown portion 11, and a downwardly and inwardly extending or beveled lower portion 12, which is adapted to correspond with and rest upon the downwardly and inwardly beveled end wall of the shell. As will be seen, I employ two of these fusible heads or rings, one for each end of the shell or cylinder, and I further form the fuse strip 6, the head spider and the segments of the head or ring as an integral structure. These fusible parts may be made of any suitable conducting material, possessing the proper degree of fusibility, such as lead alloy or the like.

In Fig. 6, I have shown the cap at the end of the shell as provided with a flat blade contact terminal 13.

As shown in Fig. 7, instead of screwing or threading the caps onto the ends of the shell, I may form an angular or bayonet slot 14 at each end of the shell, while the cap is provided with the locking pin 15.

From the above description, taken in connection with the accompanying drawing, the construction and manner of employing my invention will be readily apparent. The fuse is installed in the usual manner, and under the influence of a predetermined heavy overload, due to short circuit or otherwise the excess current, flowing through the fusible conducting element will rupture and melt the cross arms 9 of the spider 7, as the cross-sectional area of all the arms 9 of the spider is not quite equal to the cross-sectional area of all the radiating arms 8 or of the wire or ribbon 6 and is relatively small as compared with the cross-sectional area of the segments 10, as will be readily seen by reference to the accompanying drawings, and the combined current-carrying capacity of all the arms 9 of the spider is slightly less than the current-carrying capacity of the radiating arms 8 and of the main wire or ribbon 6, and substantially less than that of the segments 10. The consequence is that the fusing will take place at the cross arms 9 of the spider connecting the segments of the head or ring so that the latter which are intermediate between cross arms 9 will be separated and such segments will fall away or apart from each other and from the cap without being melted or volatilized, thereby completely opening the circuit.

When there is a rise in current to a predetermined minimum abnormal or danger point, the melting of the fuse element may be confined to its most fusible portions, namely, the cross-arms 9, thus separating the radiating arms 8 and the ribbon 6 attached thereto from the segments 10 without melting the latter, which latter will separate and fall apart and open the circuit; while on the other hand on a rise of current to a much higher degree, the radiating arms 8 and the ribbon 6 may be entirely volatilized, leaving only the segments 10 in an unmelted condition. Under conditions between the two conditions just mentioned, the melting may include the radiating arms and end portions only of the ribbon 6, leaving a portion of the latter unmelted. It will be understood, however, that under all of these various conditions, the cross-arms 9 melt, but the segments 10 do not melt but separate from each other and thereby open the circuit.

By beveling the end of the cylinder in the manner shown, I prevent a person inserting a wire within the shell and completing the circuit by bringing the ends of the wire over the ends of the shell and fastening the same in contact with the caps, for should this be attempted the ends of the wire would strike the screw threads and prevent the cap being secured in position.

It will be noted that I have provided an exceedingly simple yet positive and effective form of safety fuse which comprises in the present instance substantially but three parts, the fusible elements, the caps and the shell, so that the device may be manufactured and marketed at a relatively low cost. Furthermore, when the fuse has been ruptured, it is not necessary to entirely discard the cylinder or casing, as the latter may again be used by the simple addition of a new fusible element, which may be readily placed in position owing to the sectional construction of the shell or casing.

While I have herein shown and described one particular embodiment of my invention, by way of illustration, I wish it to be understood that I do not confine myself to all the precise details of construction herein set forth, as modification and variation may be made without departing from the spirit of the invention or exceeding the scope of the appended claims.

What I claim is:

1. In an inclosed fuse, the combination of an inclosing casing, terminals carried by said casing, and a fusible element extending through said casing and between said terminals, said element being provided with a plurality of portions substantially more readily fusible than the rest of said element upon passage of an electric current therethrough, whereby on the blowing of said fuse said element will melt at said more readily fusible portions and an intermediate portion of said element between said more readily fusible portions will be separated from the rest of said element without melting said intermediate portion.

2. In an inclosed fuse, the combination of a casing, a pair of terminals carried by said casing, and a fusible element extending through said casing and between said terminals, said element being provided with a plurality of portions of relatively small cross-sectional area, whereby on blowing of said fuse said element will melt at said portions of relatively small cross-sectional area and an intermediate portion of said element between said portions of relatively small cross-sectional area will be separated from the rest of the element without melting said intermediate portion.

3. In an inclosed fuse, the combination of a casing, terminals at the ends of said casing, and a fusible element extending through said casing and between said terminals, said element comprising a plurality of segments of relatively great current-carrying capacity connected by a plurality of portions of relatively low current-carrying capacity, whereby on blowing of said fuse said element will be melted at said portions of said relatively low current-carrying capacity and an intermediate segment between said portions of relatively low current-carrying capacity will be separated from the rest of said element without melting said segment.

4. A safety fuse comprising a casing and a fusible element contained therein, said element having a main fusible portion, fusible head segments at each end of said main fusible portion, and fusible connections between the head segments and the main fusible portion, the combined current carrying capacity of said connections being less than the current carrying capacity of the main fusible portion.

5. A safety fuse comprising a casing, and a fusible element contained therein, the latter comprising fusible head members each formed of connected segments, and a fusible member connecting the head members.

6. A safety fuse comprising a casing, and a fusible element therein, said element comprising a plurality of head members each head member being formed of separated segments, a fusible spider connecting the segments of each head, and a fusible strip connecting the spiders.

7. A safety fuse comprising a casing, a fusible ring located adjacent to each end of the casing, and a fusible connection extending between the rings, said ring being adapted to be ruptured upon the operation of the fuse, substantially as described.

8. A safety fuse comprising a casing, a fusible ring formed of a series of segments, a fusible spider connecting the segments, and a fusible strip connected to the spider.

9. A safety fuse comprising a casing, having inwardly beveled ends, a fusible ring at each end of the casing and having a beveled surface corresponding to the adjacent beveled end of the casing, a fusible connection extending between the rings, and conducting caps at the ends of the casing.

10. A safety fuse comprising a casing formed of sections of insulating material, a plurality of fusible rings spaced apart within the casing, each ring being formed of segmental members, a fusible spider frame connecting the segmental members, a fusible strip connecting the spiders, and conducting caps for the ends of the casing and engaging said rings.

11. A safety fuse comprising a casing, a fusible strip therein, a fusible spider formed of a series of arms radiating from the strip, cross arms at the ends of the radiating arms, fusible segments connected at the cross arms, and conducting caps for the ends of the casing and engaging said segments.

12. A safety fuse comprising a casing formed of assembled sections, fusible head members formed of a series of connected sections, connections between the segments of the head members, a fusible strip connecting the head members and of greater cross area than the combined cross area of the connections of the segments of each head member, and conducting caps for the ends of the casing and engaging said head members.

In witness whereof, I hereunto subscribe my name this 29th day of March, A. D., 1916.

HARRY A. YATES.

Copies of this patent may be obtained for five cents each, by addressing the "Commissioner of Patents, Washington, D. C."